United States Patent [19]

Imanishi

[11] Patent Number: 5,679,090
[45] Date of Patent: Oct. 21, 1997

[54] HALF-TOROIDAL-TYPE CONTINUOUSLY VARIABLE TRANSMISSION HAVING TWO SETS OF THREE ROLLERS

[75] Inventor: Takashi Imanishi, Yokohama, Japan

[73] Assignee: NSK Ltd., Tokyo, Japan

[21] Appl. No.: 553,032

[22] Filed: Nov. 3, 1995

[30] Foreign Application Priority Data

Nov. 7, 1994 [JP] Japan .................. 6-272613

[51] Int. Cl.$^6$ .................. F16H 15/38
[52] U.S. Cl. .................. 476/42; 476/45; 476/46; 476/41
[58] Field of Search .................. 476/42, 41, 45, 476/31, 39, 46

[56] References Cited

U.S. PATENT DOCUMENTS

| | | | |
|---|---|---|---|
| 1,903,228 | 3/1933 | Thomson | 476/42 |
| 2,039,288 | 5/1936 | Austin | 476/42 |
| 2,984,118 | 5/1961 | de Brie Perry | 476/42 |
| 5,144,850 | 9/1992 | Hibi | 74/200 |

FOREIGN PATENT DOCUMENTS

| | | | |
|---|---|---|---|
| 62-71465 | 5/1987 | Japan . | |
| 1-173552 | 12/1989 | Japan . | |
| 3-74667 | 3/1991 | Japan . | |
| 3-113153 | 5/1991 | Japan . | |
| 4-69439 | 3/1992 | Japan . | |
| 2018894 | 10/1979 | United Kingdom | 476/42 |

*Primary Examiner*—Charles A. Marmor
*Assistant Examiner*—David M. Fenstermacher
*Attorney, Agent, or Firm*—Shapiro and Shapiro

[57] ABSTRACT

A half-toroidal-type continuously variable transmission capable of transmitting great power has two sets of discs, which each include an input side disc and an output side disc, and two sets of three power rollers, one between each of the sets of discs, thus providing a total of six power rollers. Trunnions supporting the power rollers are supported by support posts. Loads applied to the support posts are transmitted to fixing rods and connecting rods and are offset in those rods.

4 Claims, 11 Drawing Sheets

HALF-TOROIDAL-TYPE CONTINUOUSLY VARIABLE TRANSMISSION HAVING TWO SETS OF THREE ROLLERS

BACKGROUND OF THE INVENTION

1. Field of the Invention

This invention relates to a toroidal type continuously variable transmission available, for example, as a transmission for an automobile, and particularly to a toroidal type continuously variable transmission having structure suited for a transmission for a large automobile carrying thereon a great cubic capacity engine of great torque.

2. Related Background Art

Figure 8:
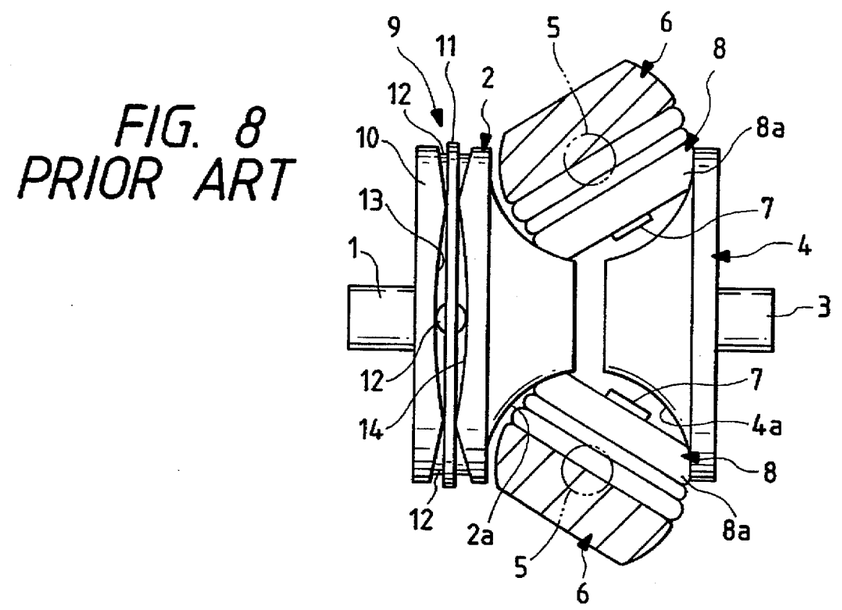
FIG. 8 is a side view showing the basic construction of a heretofore known toroidal type continuously variable transmission in the state of maximum deceleration.
Figure 9:
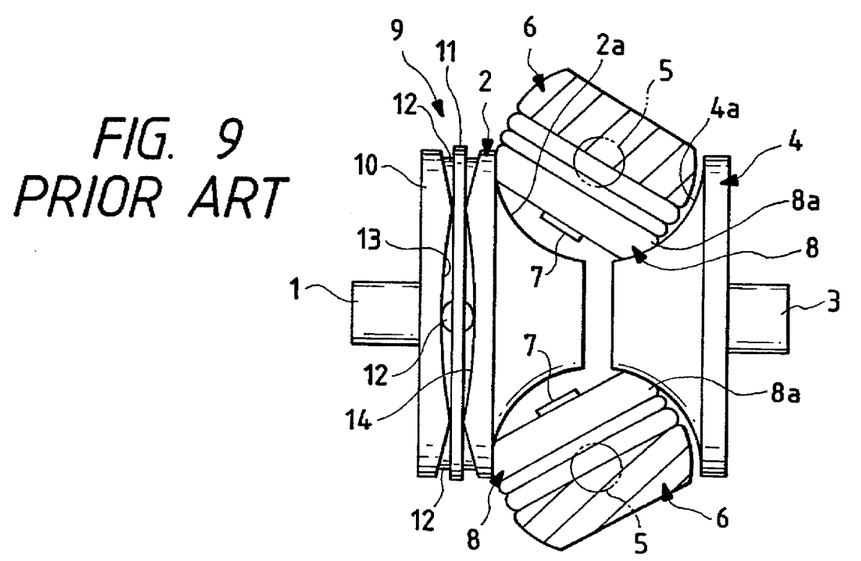
FIG. 9 is a side view showing the construction of the transmission of FIG. 8 in the state of maximum acceleration.

A toroidal type continuously variable transmission as schematically shown in FIGS. 8 and 9 of the accompanying drawings has been considered as a transmission for an automobile. This toroidal type continuously variable transmission, as disclosed, for example, in Japanese Laid-Open Utility Model Application No. 62-71465, has an input side disc 2 supported concentrically with an input shaft 1, and an output side disc 4 fixed to the end portion of an output shaft 3 disposed coaxially with the input shaft 1. Inside a casing (not shown) containing the toroidal type continuously variable transmission therein, there are provided trunnions 6 and 6 pivotable about pivots 5 and 5 lying at locations twisted relative to the input shaft 1 and the output shaft 3.

The trunnions 6 and 6 have the pivots 5 and 5 provided on the outer sides of the opposite end portions thereof. The base halves of displaceable shafts 7 and 7 are supported on the central portions of the respective trunnions 6 and 6, and the trunnions 6 and 6 are pivotally moved about the pivots 5 and 5, whereby the angles of inclination of the displaceable shafts 7 and 7 are adjustable. Power rollers 8 and 8 are rotatably supported around the fore halves of the displaceable shafts 7 and 7 supported by the trunnions 6 and 6. The power rollers 8 and 8 are sandwiched between the input side and output side discs 2 and 4.

The inner sides 2a and 4a of the input side and output side discs 2 and 4 which are opposed to each other have cross-sections forming concave surfaces provided by rotating arcs centering around the pivots 5. The peripheral surfaces 8a and 8a of the power rollers 8 and 8 which are formed into spherical convex surfaces are made to bear against the above-described inner sides 2a and 2a.

A pressing device 9 of the loading cam type is provided between the input shaft 1 and the input side disc 2, and the input side disc 2 is resiliently pressed toward the output side disc 4 by the pressing device 9. This pressing device 9 is comprised of a cam plate 10 rotatable with the input shaft 1, a plurality of (e.g., four) rollers 12, 12 retained by a retainer 11. A cam surface 13 which is an uneven surface extending in the circumferential direction is formed on one side (the right side as viewed in FIGS. 8 and 9) of the cam plate 10, and a similar cam surface 14 is formed on the outer side (the left side as viewed in FIGS. 8 and 9) of the input side disc 2. The plurality of rollers 12, 12 are supported for rotation about radial axes relative to the center of the input shaft 1.

When, during the use of the toroidal type continuously variable transmission constructed as described above, the cam plate 10 rotates with the rotation of the input shaft 1, the plurality of rollers 12, 12 are pressed against the cam surface 14 on the outer side of the input side disc 2 by the cam surface 13. As a result, the input side disc 2 is pressed against the plurality of power rollers 8, 8 and at the same time, the input side disc 2 is rotated on the basis of the pair of cam surfaces 13 and 14 being pressed against the plurality of rollers 12, 12. The rotation of this input side disc 2 is transmitted to the output side disc 4 through the plurality of power rollers 8, 8, whereby the output shaft 3 fixed to the output side disc 4 is rotated.

When deceleration is to be first effected between the input shaft 1 and the output shaft 3 to change the rotational speeds of the input shaft 1 and the output shaft 3, the trunnions 6 and 6 are pivotally moved about the pivots 5 and 5, and the displaceable shafts 7 and 7 are inclined so that as shown in FIG. 8, the peripheral surfaces 8a and 8a of the power rollers 8 and 8 may bear against that portion of the inner side 2a of the input side disc 2 which is near the center thereof and that portion of the inner side 4a of the output side disc 4 which is near the outer periphery thereof, respectively.

When conversely, acceleration is to be effected, the trunnions 6 and 6 are pivotally moved and the displaceable shafts 7 and 7 are inclined so that, as shown in FIG. 9, the peripheral surfaces 8a, 8a of the power rollers 8, 8 may bear against that portion of the inner side 2a of the input side disc 2 which is near the outer periphery thereof and that portion of the inner side 4a of the output side disc 4 which is near the center thereof, respectively. If the angle of inclination of the displaceable shafts 7 and 7 is made intermediate between that shown in FIG. 8 and that shown in FIG. 9, a medium transmission gear ratio will be obtained between the input shaft 1 and the output shaft 3.

Figure 10:
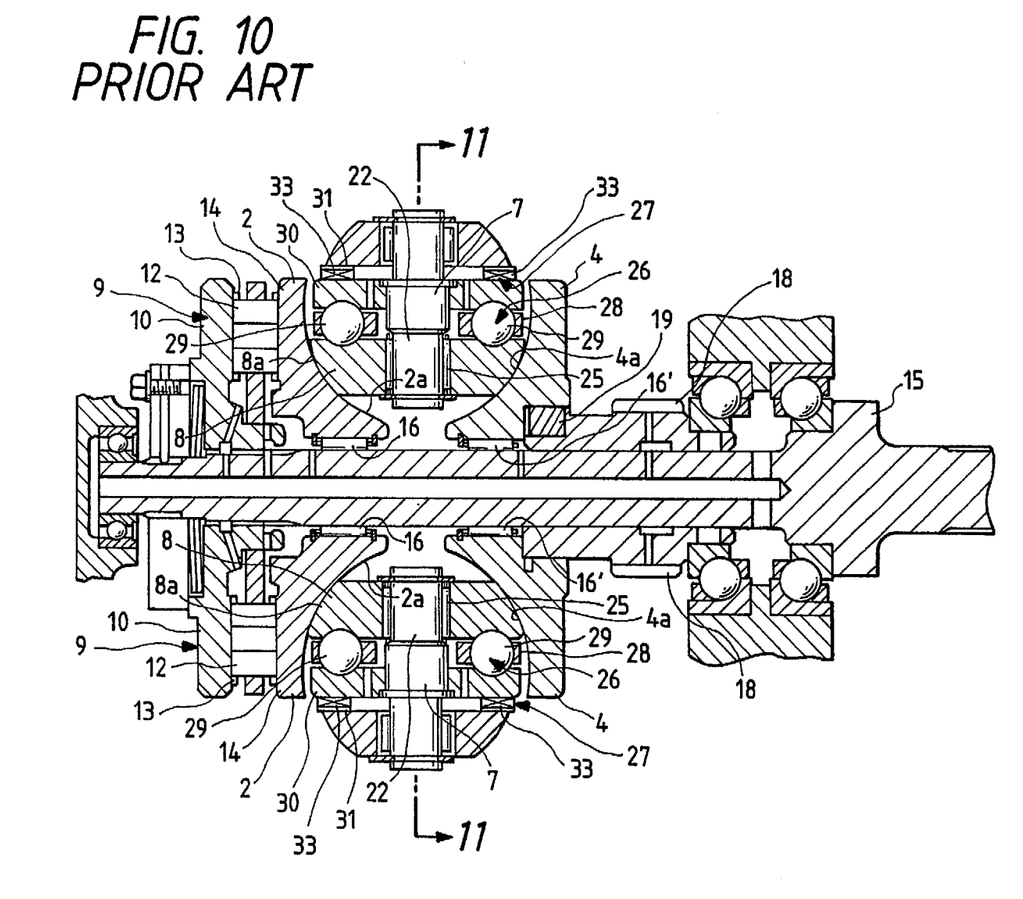
FIG. 10 is a cross-sectional view showing an example of specific structure according to the prior art.
Figure 11:
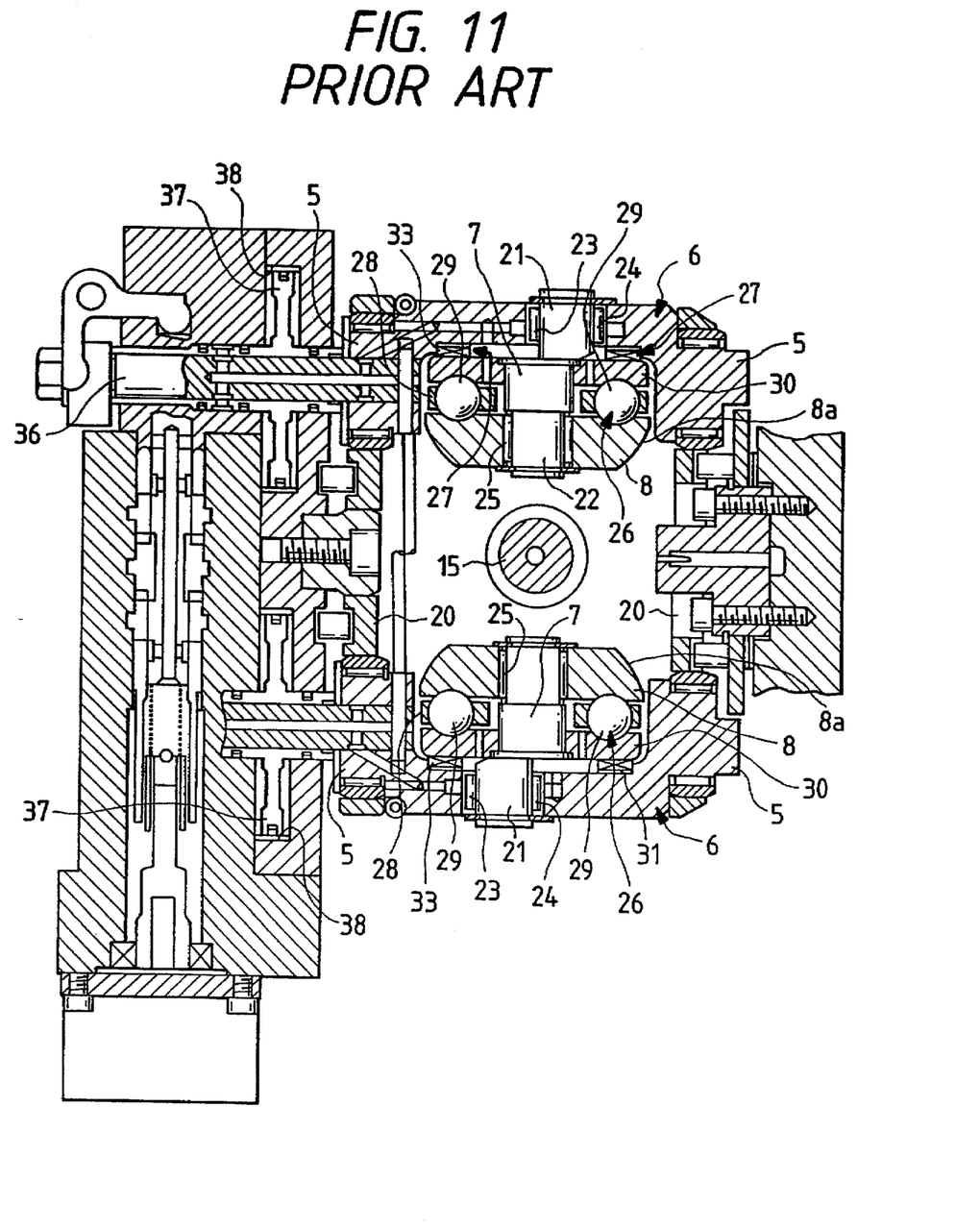
FIG. 11 is a cross-sectional view taken along the line 11—11 of FIG. 10.

FIGS. 10 and 11 of the accompanying drawings show a more specific toroidal type continuously variable transmission described in Japanese Utility Model Application No. 63-69293 (Japanese Laid-Open Utility Model Application No. 1-173552). An input side disc 2 and an output side disc 4 are rotatably supported around a tubular input shaft 15 through needle bearings 16 and 16', respectively. A cam plate 10 is spline-engaged with the outer peripheral surface of the end portion (the left end portion as viewed in FIG. 10) of the input shaft 15 and is prevented by a flange portion 17 from moving away from the input side disc 2. The cam plate 10, rollers 12, 12 and the cam surface 14 on the outer side of the input side disc 2 together constitute a pressing device 9 of the loading cam type. An output pear 18 is coupled to the output side disc 4 by a key 19 so that the output side disc 4 and the output pear 18 may rotate in synchronism with each other.

The opposite end portions of a pair of trunnions 6 and 6 are supported on a pair of support plates 20 and 20 for pivotal movement and displacement in the axial direction thereof (the direction from the front to the back of FIG. 10, and the left to right direction in FIG. 11). The base halves of displaceable shafts 7 and 7 are supported in circular holes 23 and 23 formed in the intermediate portions of the trunnions 6 and 6. These displaceable shafts 7 and 7 have support shaft portions 21 and 21 parallel to each other and eccentric relative to each other and pivot shaft portions 22 and 22. The support shaft portions 21 and 21 constituting the base halves of the displaceable shafts 7 and 7 are rotatably supported inside the circular holes 23 and 23 through radial needle bearings 24 and 24. Also, power rollers 8 and 8 are rotatably supported around the pivot shaft portions 22 and 22 constituting the fore halves of the displaceable shafts 7 and 7, through radial needle bearings 24 and 25.

The pair of displaceable shafts 7 and 7 are provided at locations opposite by displaced 180° from each other with respect to the input shaft 15. The directions in which the pivot shaft portions 22 and 22 of the displaceable shafts 7 and 7 are eccentric relative to the support shaft portions 21 and 21 are the same (the direction opposite to the left to right direction as viewed in FIG. 11) with respect to the direction of rotation of the input side and output side disc 2 and 4. Also, the direction of eccentricity is a direction substantially orthogonal to the direction of disposition of the input shaft 15. Accordingly, the power rollers 8 and 8 are supported for some displacement in the direction of disposition of the input shaft 15.

Also, between the outer sides of the power rollers 8, 8 and the inner sides of the intermediate portions of the trunnions 6, 6, thrust ball bearings 26, 26 and thrust needle bearings 27, 27 are provided in succession from the outer sides of the power rollers 8, 8. The thrust ball bearings 26, 26 permit the rotation of the power rollers 8, 8 while supporting a load in the thrust direction applied to the power rollers 8, 8. Such thrust ball bearings 26, 26 are comprised of a plurality of balls 29, 29, ring-like retainers 28, 28 rollably retaining the balls 29, 29, and ring-like outer races 30, 30. The inner race orbits of the thrust ball bearings 26, 26 are formed on the outer sides of the power rollers 8, 8 and the outer race orbits of the thrust ball bearings 26, 26 are formed on the inner sides of the outer races 30, 30.

The thrust needle bearings 27, 27 are comprised of a race 31, a retainer (not shown) and needles 33, 33. The race 31 and the retainer are combined together for some displacement in the direction of rotation. Such thrust needle bearings 27, 27 are sandwiched between the inner sides of the trunnions 6, 6 and the outer sides of the outer races 30, 30 while bearing against said inner sides. Such thrust needle bearings 27, 27 permit the pivot shaft portions 22, 22 and the outer races 30, 30 to pivotally move about the support shaft portions 21 while supporting a load applied from the power rollers 8, 8 to the outer races 30, 30.

Drive rod 36, 36 is coupled to one end portion (the left end portion as viewed in FIG. 11) of each trunnion 6, 6, and drive pistons 37, 37 are secured to the outer peripheral surfaces of the intermediate portions of the drive rods 36, 36. These drive pistons 37 and 37 are oil-tightly fitted in driving hydraulic cylinders 38 and 38, respectively. The hydraulic cylinders 38 and 38 in which the drive pistons 37 and 37 are fitted constitute an actuator for displacing the trunnions 6 and 6.

In the case of the toroidal type continuously variable transmission constructed as described above, the rotation of the input shaft 15 is transmitted to the input side disc 2 through the pressing device 9. The rotation of this input side disc 2 is transmitted to the output side disc 4 through the pair of power rollers 8 and 8, and the rotation of this output side disc 4 in turn is taken out from the output gear 18.

When the rotational speed ratio between the input shaft 15 and the output gear 18 is to be changed, the pair of drive pistons 37 and 37 are displaced in opposite directions. With the displacement of these drive pistons 37 and 37, the pair of trunnions 6 and 6 are displaced in opposite directions. For example, the lower power roller 8 in FIG. 11 is displaced rightwardly as viewed in FIG. 11 and the upper power roller 8 in FIG. 11 is displaced leftwardly as viewed in FIG. 11. As a result, the direction of a force in the tangential direction acting on the portions of contact between the peripheral surfaces 8a, 8a of the power rollers 8, 8 and the inner sides 2a and 4a of the input side disc 2 and the output side disc 4 changes. With this change in the direction of the force, the trunnions 6 and 6 pivotally move in opposite directions about the pivots 5 and 5 pivotally supported by the support plates 20 and 20. As a result, as shown in FIGS. 8 and 9, the positions in which the peripheral surfaces 8a and 8a of the power rollers 8 and 8 bear against said inner sides 2a and 4a change and thus, the rotational speed ratio between the input shaft 15 and the output gear 18 changes.

When the angles of inclination of the displaceable shafts 7 and 7 are varied to change the rotational speed ratio between the input shaft 15 and the output gear 18 as described above, these displaceable shafts 7 and 7 slightly pivotally move about the support shaft portions 21 and 21, respectively. As a result of this pivotal movement, the outer sides of the outer races 30 and 30 of the thrust ball bearings 26 and 26 and the inner sides of the trunnions 6 and 6 are displaced relative to each other. Since the thrust needle bearings 27 and 27 are present between the outer sides and the inner sides, the force required for this relative displacement is small.

In the case of the toroidal type continuously variable transmission constructed and acting as described above, the transmission of power between the input shaft 15 and the output gear 18 is effected by the two power rollers 8 and 8. Accordingly, the force per unit area transmitted between the peripheral surfaces 8a, 8a of the power rollers 8, 8 and the inner sides 2a and 4a of the input side and output side discs 2 and 4 becomes great and a limit is created on the transmittable power. In view of such circumstances, it has heretofore been considered to increase the number of the power rollers 8, 8 to increase the power transmittable by the toroidal type continuously variable transmission. The following two kinds of structure are basically known as structure for increasing the number of the power rollers 8, 8.

(a) Three power rollers 8, 8 are disposed between a set of input side disc 2 and output side disc 4 and the transmission of power is effected by these three power rollers 8, 8.

(b) Two sets of input side discs 2 and output side discs 4 are provided in parallel relative to the direction of transmission of power and two power rollers each, totalling four power rollers, are disposed between the input side discs 2 and output side discs 4 constituting the respective sets, and the transmission of power is effected by these four power rollers 8, 8.

Figure 12:
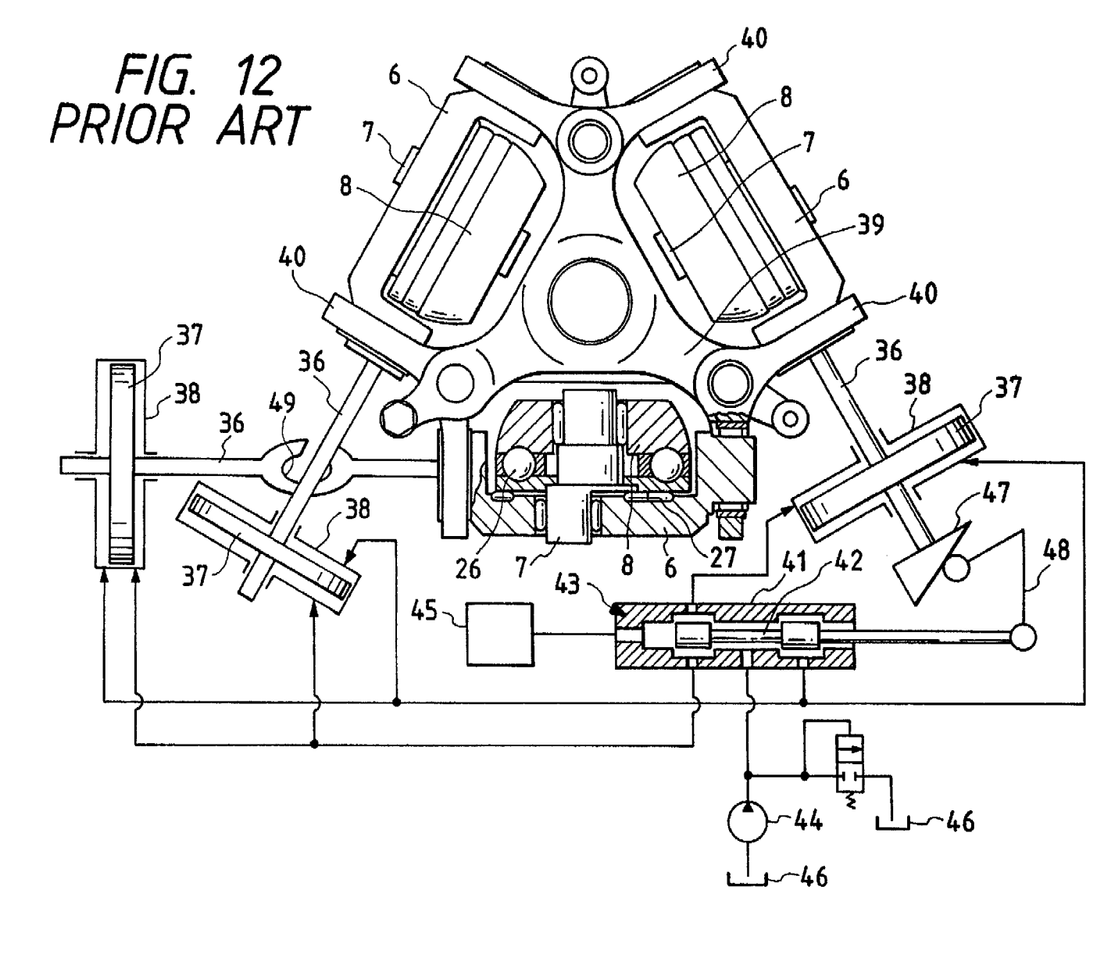
FIG. 12 is a front view showing, partly in cross-section, the principal portions of a first example of heretofore known structure for making transmittable power greater.

For example, in Japanese Laid-Open Patent Application No. 3-74667, there is described the structure of item (a). In the case of the structure described in this publication, as shown in FIG. 12 of the accompanying drawings, the intermediate portions of support pieces 40, 40 bent by 120° are pivotally supported at three equidistant locations in the circumferential direction of a fixed frame 39. Trunnions 6, 6 are supported between the adjacent support pieces 40 and 40 for pivotal movement and displacement in the axial direction thereof.

One end of each drive rod 36, 36 is connected to one end portion of each trunnion 6, 6, and the other ends of the drive rods 36, 36 are connected to the drive pistons of hydraulic cylinders 38, 38 which are actuators. These hydraulic cylinders 38, 38 lead to the discharge port of a pump which is a hydraulic source, through a control valve 43 provided with a sleeve 41 and a spool 42 displaceable in the axial direction thereof (the left to right direction as viewed in FIG. 12).

When the angles of inclination of power rollers 8 and 8 pivotally supported on the trunnions 6 and 6, respectively, by displaceable shafts 7 and 7 are to be changed, the sleeve 41 is displaced in the axial direction thereof (the left to right direction as viewed in FIG. 12) by a control motor 45. As a result, pressure oil discharged from the pump 44 is supplied into the hydraulic cylinders 38 and 38 through hydraulic piping. The drive pistons 37 and 37 fitted to the hydraulic cylinders 38 and 38 are displaced in the same direction with respect to the direction of rotation of the input side disc 2 and output side disc 4 (see FIGS. 8 to 10). Operating oil forced out of the hydraulic cylinders 38 and 38 with the displacement of the drive pistons 37 and 37 is returned to an oil reservoir 46 through hydraulic piping (partly not shown) also including the control valve 43.

The displacement of the drive pistons 37 resulting from the supply of the pressure oil is transmitted to the spool 42 through a cam 47 and a ring 48 to thereby displace this spool 42 in the axial direction. As a result, with the drive pistons 37 displaced by a predetermined amount, the flow path of the control valve 43 is closed, whereby the supply of the pressure oil to the hydraulic cylinders 38 and 38 is stopped. Thus, the amounts of axial displacement of the trunnions 6, 6, i.e., the angles of inclination of the power rollers 8, 8, correspond to the amount of displacement of the sleeve 41 by the control motor 45.

Figure 13:
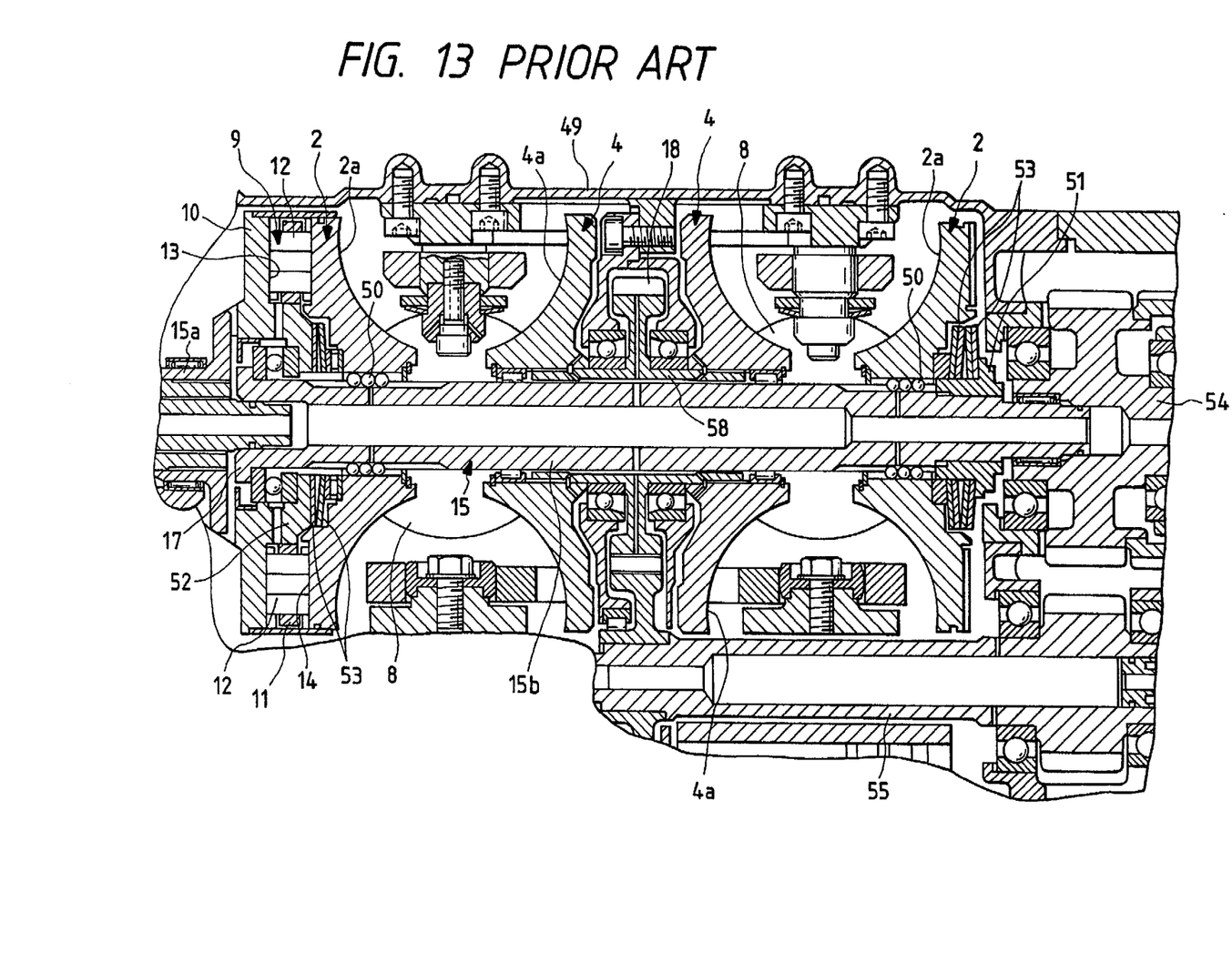
FIG. 13 is a fragmentary cross-sectional view showing a second example of the heretofore known structure for making transmittable power greater.

Also, in Japanese Laid-Open Patent Application No. 4-69439 and U.S. Pat. No. 5,144,850, there is described the structure of item (b) above. In the conventional structure corresponding to this item (b), as shown in FIG. 13 of the accompanying drawings, an input shaft 15 is supported inside a housing 49 only for rotation. This input shaft 15 comprises a front half 15a coupled to the output shaft or the like of a clutch, and a rear half 15b somewhat rotatable relative to the front half 15a. A pair of input side discs 2 and 2 are supported on the axially (the left to right direction as viewed in FIG. 13) opposite end portions of the rear half 15b through ball splines 50 and 50 with the inner sides 2a and 2a thereof opposed to each other. Belleville springs 53 and 53 are provided between the backs of the input side discs 2, 2 and a loading nut 51 or a loading plate 52. A pre-load toward output side discs 4, 4 which will hereinafter be described is imparted to the input side discs 2, 2 by the belleville springs 53, 53.

A pair of output side discs 4 and 4 are supported on the opposite end portions of a sleeve 58 rotatably supported around the intermediate portion of the rear half 15b with the inner sides 4a and 4a thereof opposed to the inner sides 2a and 2a of the input side discs 2 and 2. Also, a plurality of power rollers 8, 8 rotatably supported on a plurality of trunnions through displaceable shafts are sandwiched between the above-mentioned inner sides 2a and 4a. Also, inside the housing 49 and on the side opposite to the above-described front half 15a, an output shaft 54 is rotatably supported concentrically with and independently of the rear half 15b of the input shaft 15. The rotation of the output side discs 4 and 4 is transmittable to the output shaft 54 by a power transmitting device comprising a transmission shaft 55 and a plurality of gears.

In the case of the toroidal type continuously variable transmission constructed as described above, the pair of input side discs 2 and 2 rotate simultaneously with the rotation of the input shaft 15. This rotation is transmitted to the pair of output side discs 4 and 4 simultaneously, and is transmitted to the output shaft 54 by the above-described power transmitting device and is taken out from it. At this time, the transmission of the rotational force is effected by the four power rollers 8, 8 while being divided into two parallel lines and therefore, great power (torque) becomes transmittable.

SUMMARY OF THE INVENTION

The structure of item (a) as shown in FIG. 12 and the structure of item (b) as shown in FIG. 13, as compared with the structure shown in FIGS. 10 to 11, capable of transmitting great power, nevertheless are limited in the transmission of power. Accordingly, to enable greater power to be transmitted, it is necessary to realize novel structure.

To make transmittable power greater, as is apparent from the foregoing description, the number of the power rollers 8, 8 can be increased. Accordingly, if two sets of input side and output side discs 2 and 4 are provided as shown in FIG. 13 and three power rollers are provided for each set as shown in FIG. 12 to combine the structure of item (a) and the structure of item (b), six power rollers in total are provided between the discs 2 and 4 of the respective sets, and there will be provided a toroidal type continuously variable transmission capable of transmitting greater power.

However, the structure for supporting the trunnions 6, 6 rotatably supporting the three power rollers 8, 8 disposed at equal intervals on the circumference and further, supporting the load applied to these trunnions 6, 6 is complicated, and there is no known practical support structure when two sets of three power rollers 8, 8 each are provided. That is, except when the transmission gear ratio between the input side and output side discs 2 and 4 is 1 (the discs 2 and 4 rotate at the same speed), a load in the axial direction of the discs 2 and 4 is applied to the power rollers 8, 8. This load is applied through the trunnions 6, 6 to the support pieces 40, 40 (FIG. 12) supporting these trunnions 6, 6. Accordingly, structure for supporting the load applied to these support pieces 40, 40 becomes necessary, but such structure for the case where six power rollers 8, 8 are provided is not yet known. The toroidal type continuously variable transmission of the present invention has been made in view of such circumstances.

The toroidal type continuously variable transmission of the present invention is provided with a housing, a fixed member provided inside said housing, a first rotary shaft rotatably supported by said fixed member, a second rotary shaft inserted in said first rotary shaft and rotatable relative to said first rotary shaft, a pair of first discs each having an inner side surface of an arcuate concave surface and an outer side surface provided on a back side of inner side surface, said first discs being nonrotatably fitted to said first rotary shaft with said outer side surfaces opposed to said fixed member, a pair of second discs each having an inner side surface of an arcuate concave surface and an outer side surface provided on back side of said inner side surface, said second discs being nonrotatably fitted to said second rotary shaft with said inner side surfaces opposed to said inner surfaces of said first discs, power rollers having peripheral surfaces formed into spherical convex surfaces, which contact the inner side surfaces of said first and second discs, three said power rollers being provided between said first and second discs, displaceable shafts rotatably supporting said power rollers and a trunnion for supporting said displaceable shaft, wherein said transmission further comprises a pivot having an axis orthogonal to said first and second rotary shafts to tiltably support said trunnion, support pieces pivotally supporting said pivots at both ends thereof, rockably supporting shafts for rockably supporting said support pieces and two support posts each supporting three of said rockably supporting shafts, said support posts each being provided between said first and second discs and having a base portion through which said second rotary shaft is inserted and three support arm portions provided with first and second plate portions which extend substantially in parallel to each other from said base portion, said rockably supporting shaft being inserted through said first and second plate portions of said arm portions and said first plate portion of each said support post is fixed to said fixed member through a fixing rod.

The support posts are each provided with a base portion disposed between said first discs and said second discs, a through-hole formed in the central portion of said base portion and in which said second rotary shaft is inserted, bifurcated support arm portions radially extending from three locations on the outer peripheral edge of said base portion and each having a pair of plate portions, a fixed arm portion extending from the fore end of one of the pair of plate portions constituting each of said support arm portions which is adjacent to said fixed wall, and a connecting arm portion extending from the fore end of the plate portion which is remote from said fixed wall. Each of said pivotally movable support shafts is extended between a pair of plate portions constituting each of said support arm portions, and the intermediate portions of said support pieces are sandwiched between said pair of plate portions. Also, the fore end portion of each of said fixed arm portions is coupled and fixed to the end portion of a fixing rod fixed to said fixed wall, and the fore end portion of each of said connecting arm portions is coupled and fixed to the end portion of a connecting rod.

The toroidal type continuously variable transmission of the present invention constructed as described above effects the transmission of rotational force between the first rotary shaft and the second rotary shaft on the basis of action similar to that of the aforedescribed toroidal type continuously variable transmission according to the prior art. Further, by changing the angle of inclination of the trunnions provided between the first discs and the second discs, the rotational speed ratio between these discs is changed.

Particularly, in the toroidal type continuously variable transmission of the present invention, there are two sets each having three power rollers, six in total, and therefore the power transmittable between the first rotary shaft and the second rotary shaft can be made great. Also, of the loads applied from the power rollers to the support pieces through the trunnions during the transmission of power, radial loads are transmitted to the support posts and are offset in these support posts. Also, thrust loads are transmitted to the fixing rod and the connecting rod and are offset in these rods.

DESCRIPTION OF THE PREFERRED EMBODIMENTS

FIGS. 1 to 6 show a first embodiment of the present invention. A sleeve 58 which is a first tubular rotary shaft is rotatably supported in a through-hole 57 formed in a fixed wall 56 provided inside a housing 49, by a pair of antifriction bearings 59 and 59 which are angular type ball bearings. An input shaft 15 which is a second rotary shaft is inserted in the sleeve 58.

The inner peripheral surfaces of output side (first) discs 4 and 4 are spline-engaged with the outer peripheral surfaces of the opposite end portions of the sleeve 58. Accordingly, these output side discs 4 and 4 are supported on the axially (the left to right direction as viewed in FIG. 1) opposite end portions of the sleeve 58 so that they are nonrotatable relative to the sleeve 58. Supported on the opposite end portions of the sleeve 58 as described above, the output side discs 4 and 4 have their outer sides opposed to the bide of the fixed wall 56. Also, the inner sides 4a and 4a of the output side discs 4 and 4 which are turning-arcuate concave surfaces face in opposite directions.

Near the axially (the left to right direction as viewed in FIG. 1) opposite end portions of the input shaft 15, input side (second) discs 2 and 2 are supported through ball splines 60 and 60, respectively. Accordingly, these input side discs 2 and 2 are supported near the axially opposite end portions of the input shaft 15 so that they can be displaced axially relative to the input shaft 15, but are nonrotatable relative to the input shaft. The inner sides 2a and 2a of these input side discs 2, like the inner sides 4a and 4a of the output side discs 4 and 4, are turning-arcuate concave surfaces, and the inner sides 2a and 4a of the discs 2 and 4 are opposed to each other.

Figure 1:
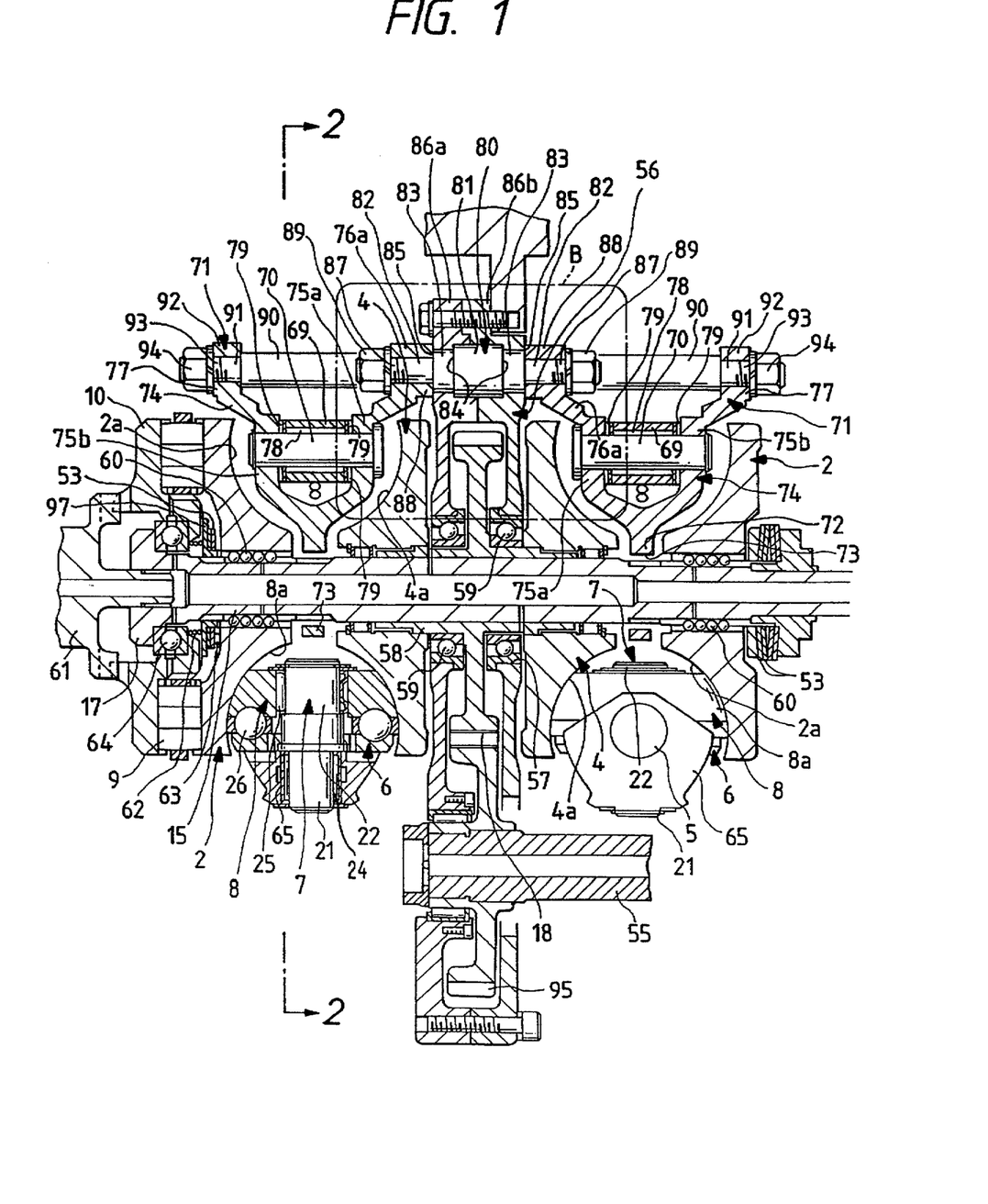
FIG. 1 is a cross-sectional view showing the principal portions of an embodiment of the present invention.

Also, rotational power is transmittable from a drive shaft 61 through a pressing device 9 to the input side disc 2 of the pair of input side discs 2 and 2 supported on the opposite end portions of the input shaft 15 as described above which is adjacent to one end (the left end as viewed in FIG. 1). The rotational power transmitted to this input side disc 2 adjacent to one end is transmittable through the input shaft 15 to the input side disc 2 which is adjacent to the other end (the right end as viewed in FIG. 1). Also, resilient forces toward each other are imparted to the pair of input side discs 2 and 2 by belleville springs 53 and 53. This is for the purpose of reliably causing the inner sides 2a and 4a of the discs 2 and 4 to bear against the peripheral surfaces 8a and 8a of power rollers 8 and 8 which will hereinafter be described. A coil spring 62 is provided on the back of a wear plate 97 against the front surface of which the belleville spring 53 for pressing the input side disc 2 adjacent to one end bears, thereby preventing the backlash of this wear plate 97.

Also, between the back of the input side disc 2 adjacent to one end and a flange portion 17 formed on one end of the input shaft 15, the belleville springs 53, the coil spring 62, a cam plate 10 constituting the pressing device 9, a thrust roller bearing 63 and a thrust ball bearing 64 are provided in series with the above-described members 53, 62 and 10. The thrust roller bearing 63 compensates for the relative displacement of the input side disc 2 adjacent to one side and the cam plate 10 in the direction of rotation, and the thrust ball bearing 64 compensates for the relative displacement of the cam plate 10 and the input shaft 15 in the direction of rotation.

Each of the two sets having three power rollers 8 and 8, six in total, are provided between the inner sides 2a and 2a of the two input side discs 2 and 2 and the inner sides 4a and 4a of the two output side discs 4 and 4 disposed as described above. These power rollers 8 and 8 have their peripheral surfaces 8a and 8a formed into spherical convex surfaces, and are disposed at equal intervals (at a central angle pitch of 120°) in the circumferential direction with their peripheral surfaces 8a and 8a bearing against the inner sides 2a and 4a of the input side discs 2, 2 and the output side discs 4, 4. Also, the phases of the power rollers 8, 8 of each set in the circumferential direction are made coincident with each other.

Figure 2:
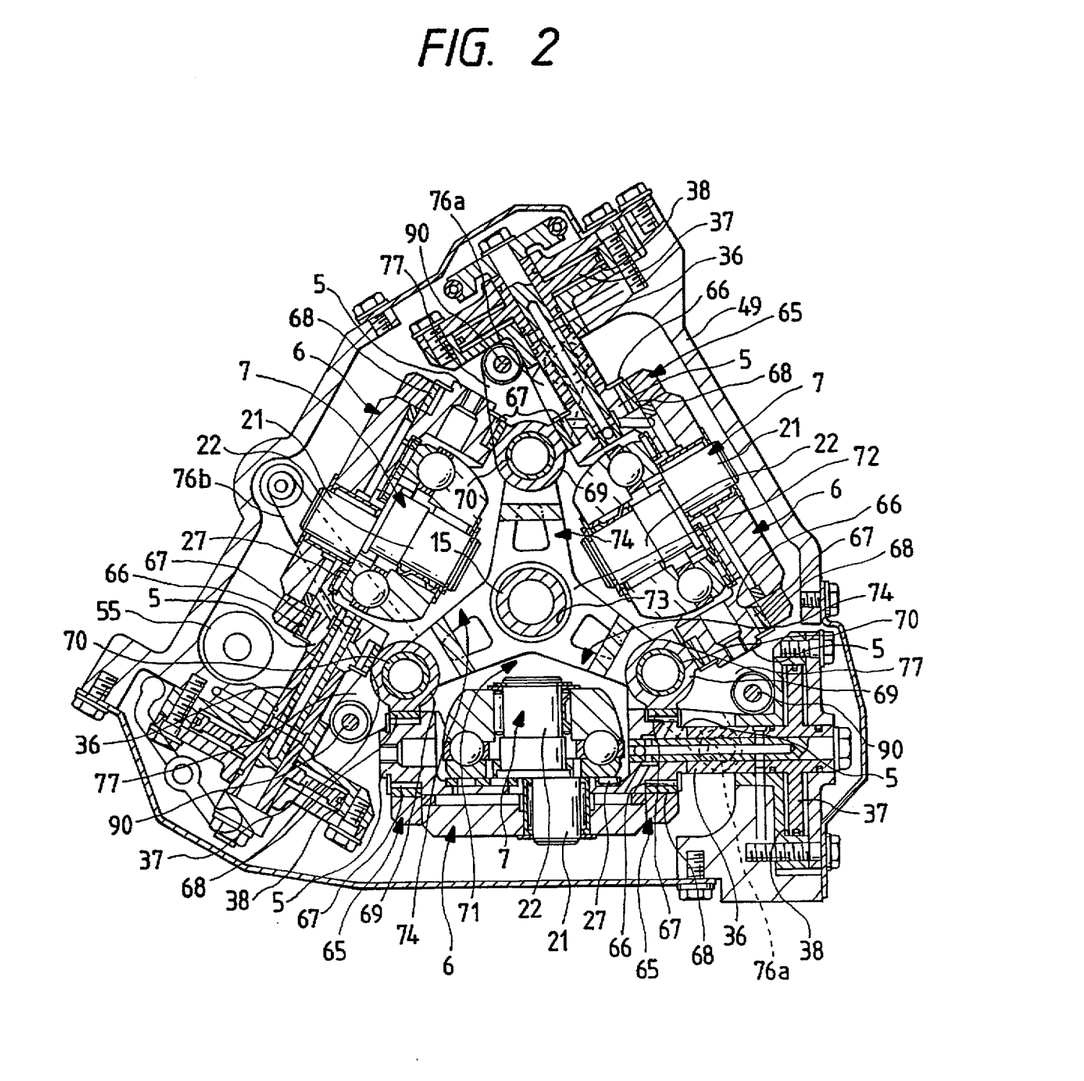
FIG. 2 is a partial view of a cross-section taken along the line 2—2 of FIG. 1.
Figure 3:
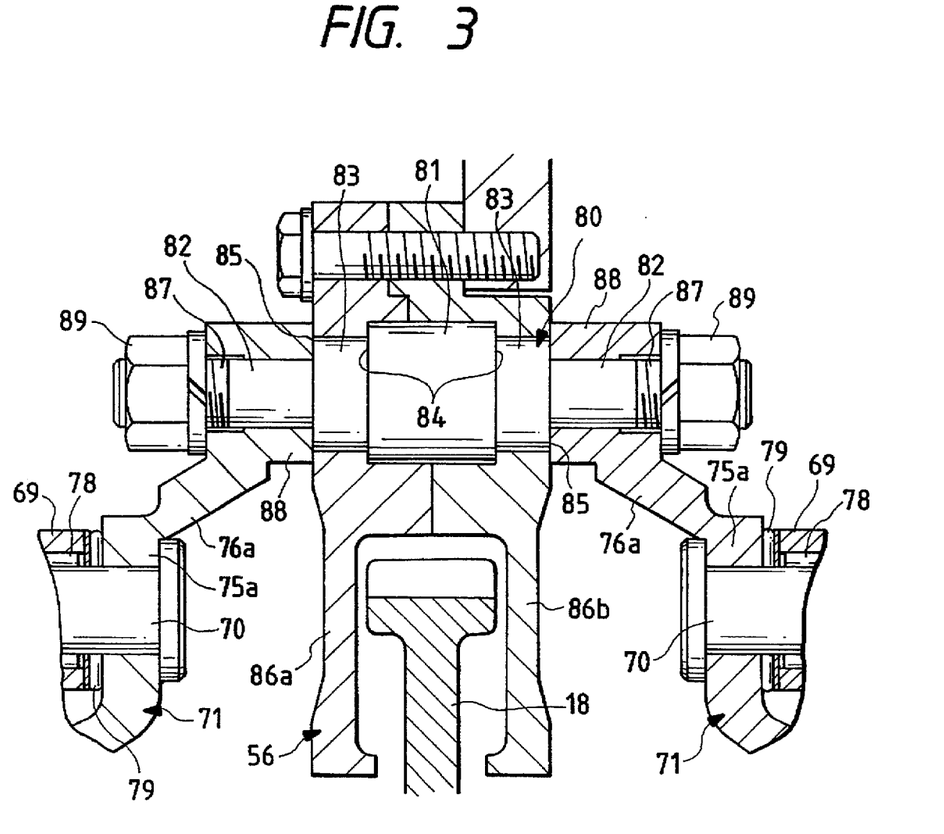
FIG. 3 is an enlarged view of the portion B of FIG. 1.
Figure 4:
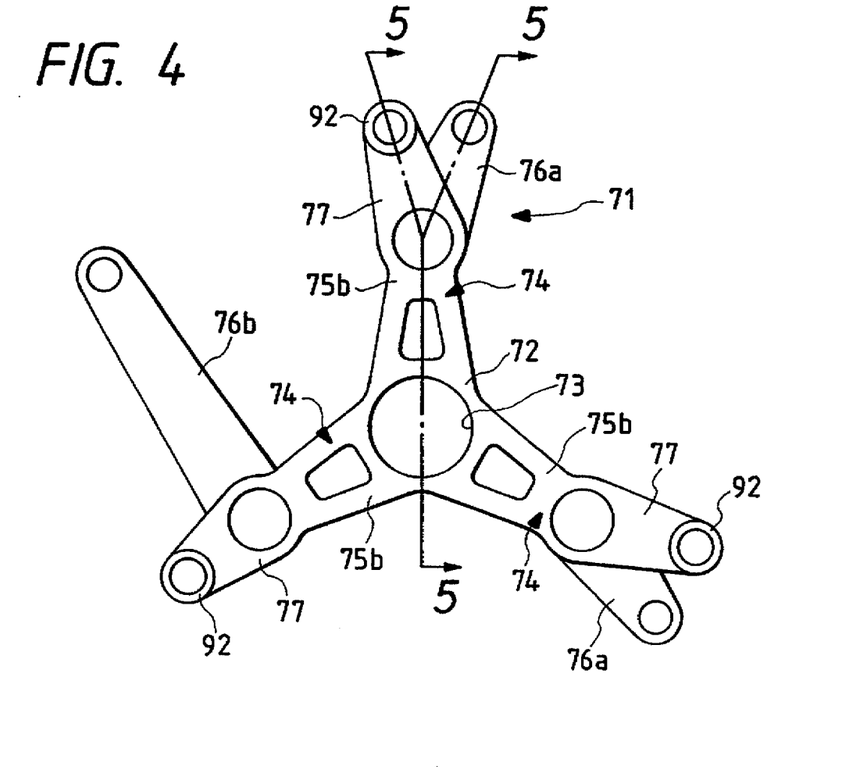
FIG. 4 is a view of only a support post as it is seen in the same direction as in FIG. 2.
Figure 5:
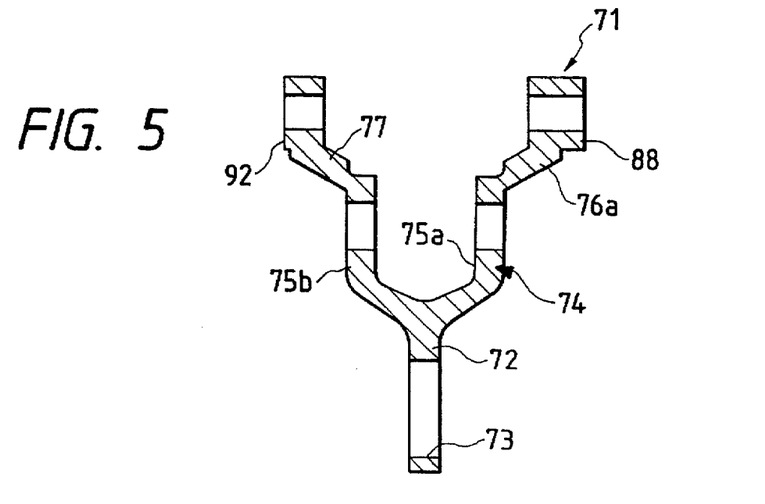
FIG. 5 is a cross-sectional view taken along the line 5—5 of FIG. 4.
Figure 6:
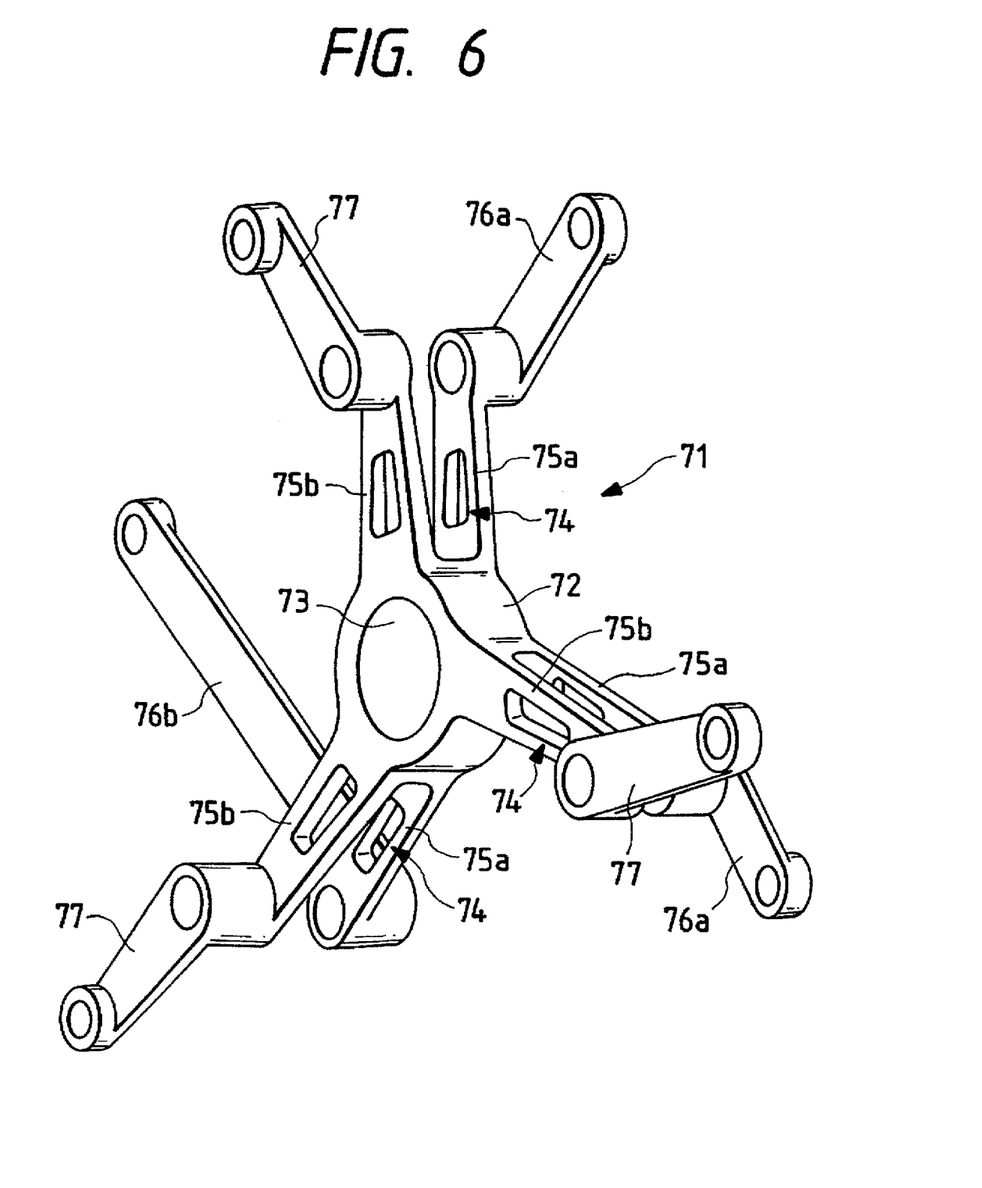
FIG. 6 is a perspective view of the support post.

The two sets each having three power rollers, six in total, are rotatably supported around pivot shaft portions constituting the fore halves of displaceable shafts 7, 7, through radial needle bearings 25, 25. Also, support shaft portions 21, 21 constituting the base halves of the displaceable shafts 7, 7 are rotatably supported on the intermediate portions of the trunnions 6, 6 through radial needle bearings 24 (FIG. 2). Between the inner sides of these trunnions 6, 6 and the outer end surfaces of the power rollers 8, 8, a thrust ball bearing 26 (FIG. 1) and a thrust needle bearing 27 (FIG. 2) are provided in succession from the side of the outer end surfaces. The functions of these bearings 26 and 27 are similar to those in the aforedescribed prior-art apparatus.

The number of the trunnions 6, 6 is one for each of the power rollers 8, 8, and accordingly three for each set, i.e., six in total. Pivots 5, 5 coaxial with each other are projectedly provided on the opposite end portions of each of the trunnions 6, 6. The pivots 5, 5 provided on the opposite end portions of a trunnion 6 are coaxial with each other and are disposed in twisted positional relationship with the input shaft 15.

Between circumferentially adjacent ones of the trunnions 6, 6, one support piece 65 is provided, that is, three for each set, six in total, support pieces 65, 65 are provided. Each of these support pieces 65, 65 is formed into a dog-legged shape having a bend angle of 120° and having sufficient rigidity due to the use of a metal material. Circular holes 66 and 66 are formed in the opposite end portions of each of these support pieces 65, 65, and the pivots 5, 5 are pivotably supported in these circular holes 66, 66 through radial needle bearings 67, 67. The outer peripheral surfaces of outer races 68, 68 constituting these radial needle bearings 67, 67 are formed into spherical convex surfaces and are given the aligning function of compensating for the incoincidence between the center axes of the pivots 5, 5 and the circular holes 66, 66.

Cylindrical portions 69, 69 parallel to the input shaft 15 are provided on the intermediate portions of the support pieces 65, 65 as described above. Three of the support pieces 65, 65 are pivotally supported on each of two support posts 71, 71 which will be described next, by pivotally movable support shafts 70, 70 inserted in the cylindrical portions 69, 69. Each one of these support posts 71, 71 is disposed between the inner side 2a of each of the input side disc 2 and the inner side 4a of each of the output side disc 4, and is supported by and fixed to the fixed wall 56. Accordingly, the two support posts 71, 71 are disposed on the opposite sides of the fixed wall 56 with this fixed wall 56 interposed therebetween.

The support posts 71, 71 have ring-like base portions 72, 72. Circular through-holes 73, 73 are formed in the central portions of the base portions 72, 72, and the intermediate portions of the input shaft 15 which are between the input side discs 2, 2 and the output side discs 4, 4 are inserted in the through-holes 73, 73. Support arm portions 74, 74 radially extend from three locations on the outer peripheral edges of such base portions 72, 72. The angle of intersection between the center lines of circumferentially adjacent ones of the support arm portions 74, 74 is 120°.

The support arm portions 74, 74 each are formed into a bifurcated shape and have a pair of plate portions 75a and 75b parallel to each other. Fixed arm portions 76a and 76b extend diametrally outwardly or in the tangential direction from the fore ends of those of the plate portions 75a and 75b constituting the support arm portions 74 and 74 which are adjacent to the fixed wall 56. That is, the fixed arm portions 76a, 76a extend diametrally outwardly from the fore ends of two of the three plate portions 75a, 75a provided for each of the support posts 71, 71, and the fixed arm portion 76b extends in the tangential direction from the fore end of the remaining one plate portion 75a. It is for preventing the interference between a fixing rod 80 (to be described), to which the fore end of the fixed arm portion 76b is coupled, and a transmission gear 95 (to be described) that the direction of extension of the fixed arm portion 76b is made to differ from the directions of extension of the other fixed arm portions 76a, 76a.

Also, connecting arm portions 77, 77 extend diametrally from the fore ends of the support plate portions 75b, 75b on the side remote from the fixed wall 56. However, one or both of the fixed arm portions 76a, 76a and the connecting arm portions 77, 77 are inclined a little with respect to the diametral direction so that the fore end portions of the fixed arm portions 76a, 76a and the fore end portions of the connecting arm portions 77, 77 may not be superposed one upon the other in the axial direction of the input shaft 15.

The pivotally movable support shafts 70, 70 are extended between the pair of plate portions 75a and 75b constituting the support arm portions 74, 74. Also, the cylindrical portions 69, 69 formed on the intermediate portions of the support pieces 65, 65 are sandwiched between the pair of plate portions 75a and 75b. In the case of the illustrated embodiment, the cylindrical portions 69, 69 are pivotally supported around the intermediate portions of the pivotally movable support shafts 70, 70 through radial needle bearings 78, 78, respectively. Thrust needle bearings 79, 79 are sandwiched between the opposite end surfaces of the cylindrical portions 69, 69 and the inner sides of the plate portions 75a, 75b. Accordingly, the support pieces 65, 65 are pivotably supported on the support arm portions 74, 74 and thrust loads applied to the support pieces 65, 65 are supported by the support arm portions 74, 74.

The fixed arm portions 76a, 76b extending diametrally or in the tangential direction from the plate portions 75a, 75a adjacent to the fixed wall are coupled and fixed to the end portions of three fixing rods 80 fixed to the fixed wall 56. These fixing rods 80 each comprise an intermediate large-diametered portion 81 and small-diametered portions 82, 82 at the opposite ends connected together by medium-diametered portions 83, 83 and stepped portions 84, 85. Such fixing rods 80 are held and fixed between two wall plates 86a and 86b constituting the fixed wall 56, against displacement in the axial direction (the left to right direction as viewed in FIGS. 1 and 3). The stepped portions 85, 85 connecting the small-diametered portions 82, 82 and the medium-diametered portions 83, 83 together in this state lie on the same plane as the side of the fixed wall 56. The small-diametered portions 82, 82 protrude from the both sides of the fixed wall 56.

In this manner, circular ring portions 88, 88 formed on the tip end portions of the fixed arm portions 76a, 76b are fitted on the small-diametered portions 82, 82 protruding from the both sides of the fixed wall 56. Nuts 89, 89 are threadably engaged with externally threaded portions 87, 87 formed on the tip end portions of the small-diametered portions 82, 82 which protrude from the circular ring portions 88, 88. As a result, the plate portions 75a, 75a are coupled and fixed to the fixed wall 56 through the fixed arm portions 76a, 76b.

The opposite end portions of connecting rods 90 are connected to the tip end portions of the connecting arm portions 77, 77 extending diametrally outwardly from the fore ends of the plate portions 75b, 75b which are remote from the fixed wall 56. Small-diametered portions 91, 91 are formed on the opposite end portions of the connecting rods 90, and circular ring portions 92, 92 formed on the tip end portions of the connecting arm portions 77, 77 are fitted on the small-diametered portions 91, 91. Nuts 94, 94 are threadably engaged With externally threaded portions 93, 93 formed on the tip end portions of the small-diametered portions 91, 91 which protrude from the circular ring portions 92, 92. A through-hole is formed in a portion of the fixed wall 56 and the connecting rods 90 are inserted therein to make the connecting arm portions 77, 77 of the pair of support posts 71, 71 connectable together by the connecting rod 90 as described above.

Figure 7:
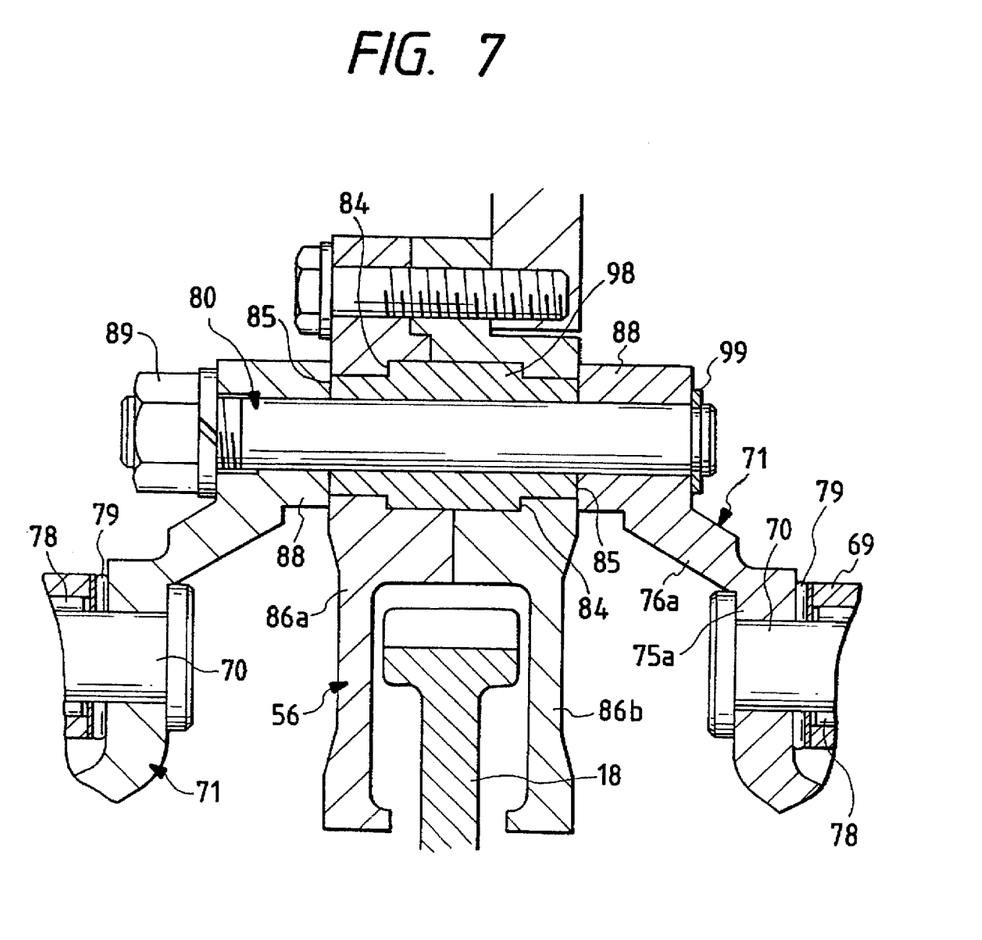
FIG. 7 is a view similar to FIG. 3 but showing another structure of a coupling portion between the support post and a fixed wall.

As is apparent from the foregoing description, the two support posts 71 and 71 are formed into plane-symmetrical shapes. The number of the fixing rods 80 and the number of the connecting rods 90 are three each. Further, to construct the coupling portions for coupling the fixed arm portions 76a, 76b or the connecting arm portions 77, 77 to the opposite end portions of the fixing rods 80 and the connecting rods 90, the nuts 89 and 94 as shown are not restrictive, but, as in FIG. 7 showing a second embodiment, use may be made of restraining members, such as stop rings 99, other than the nuts, or the end portions of the rods 80 and 90 may be formed like rivets. Furthermore, the large-diametered portions 81, the small-diametered portions 82, 82, the medium-diametered portions 83, 83 and the stepped portions 84, 85 are formed directly on the outer peripheral surfaces of the fixing rods 80, but alternatively, as in FIG. 7 showing the second embodiment, they may be formed on the outer peripheral surface of sleeves 98 on which the fixing rods 80 are fitted. In any case, as will hereinafter be described, a strong axial force acts on the coupling portions during the operation of the toroidal type continuously variable transmission. Accordingly, the coupling portions need be constructed so as to withstand such a force and to be displaced neither in the radial direction nor in the thrust direction.

Further, six drive rods 36, 36, drive pistons 37, 37, and hydraulic cylinders 38, 38 in total are provided for the trunnions 6, 6 so that the trunnions 6, 6 may be displaceable axially of the pivots 5, 5.

The toroidal type continuously variable transmission of the present invention constructed as described above effects the transmission of rotational force between the sleeve 58 and the input shaft 15 on the basis of action similar to that of the previously described prior-art toroidal type continuously variable transmission. That is, the rotation of the drive shaft 61 is transmitted to the cam plate 10 of the pressing device 9 through the uneven engaging portion, and with the rotation of this cam plate 10, the left input side disc 2 as viewed in FIG. 1 is rotated while being pressed rightwardly as viewed in FIG. 1. At the same time, the right input side disc 2 as viewed in FIG. 1 is rotated in the same direction through the ball splines 60, 60 and the input shaft 15.

The rotation of these input side discs 2, 2 is transmitted to the output side discs 4, 4 through the six power rollers 8, 8, whereby the sleeve 58, which is spline engaged at opposite end portions with the output side discs 4, 4, and the output gear 18 secured to the outer peripheral surface of the intermediate portion of the sleeve 58 are rotated. The rotation of the output gear 18 is imported to the transmission shaft 55 through the transmission gear 95.

Further, when the rotational speed ratio between the drive shaft 61 and the transmission shaft 55 is to be changed, the angle of inclination of the trunnions 6, 6 provided between the input side discs 2, 2 and the output side discs 4, 4 is changed. That is, as in the case of the prior-art structure shown in FIGS. 10 to 12, oil pressure is supplied into the hydraulic cylinders 38, 38, whereby the trunnions 6, 6 are displaced axially of the pivots 5, 5. Then, the direction of the force acting on the portions of contact between the peripheral surfaces 8a, 8a of the power rollers 8, 8 pivotally supported by the trunnions 6, 6 and the inner sides 2a, 4a of the discs 2, 4 in the tangential direction is changed to thereby tilt the trunnions 6, 6 about the respective pivots 5, 5.

Particularly, in the case of the toroidal type continuously variable transmission of the present invention, there are two sets each having three power rollers 8, 8, six in total, and therefore, the power transmittable between the input shaft 15 and the sleeve 58 can be made great. Also, the thrust loads applied from the power rollers 8, 8 to the support pieces 65, 65 through the trunnions 6, 6 during the transmission of the power are applied to the opposite end portions of the fixing rods 80, 80 and the connecting rods 90, 90 in opposite directions and are offset thereby. Not only the thrust loads, but also radial loads directed diametrally outwardly are applied to the trunnions 6, 6. However, the radial loads are applied in the same amount to the circumferentially uniformly disposed trunnions 6, 6 and are therefore offset by each other in a state in which they are transmitted to the support posts 71, 71.

The reason why the above-described thrust loads are created and the mechanism provided for the rods 80, 90 to support the thrust loads are as follows. During the operation of the toroidal type continuously variable transmission, the power rollers 8, 8 are strongly sandwiched between the input side discs 2, 2 and the output side discs 4, 4 by the action of the pressing device 9. As a result, a strong force pushing the power rollers 8, 8 diametrally outwardly of the discs 2, 4 is applied to the power rollers 8, 8. This force is applied axially of the displaceable shafts 7, 7. Also, as previously described, the axial direction of the shafts 7, 7 is inclined with respect to a line orthogonal to the input shaft 15 unless the rotational speeds of the input side discs 2, 2 and the output side discs 4, 4 are made equal to each other. The above-described thrusts are created by an amount corresponding to the inclination.

For example, when, in order to effect acceleration between the input side discs 2, 2 and the output side discs 4, 4, the peripheral surfaces 8a, 8a of the power rollers 8, 8 are made to bear against those portions of the inner sides 2a, 2a of the input side discs 2, 2 which are near the outer diameter thereof and those portions of the inner sides 4a, 4a of the output side discs 4, 4 which are near the inner diameter thereof, thrust loads toward each other are applied to the pair of support posts 71 and 71. In this state, one end surface of each of the cylindrical portions 69, 69 of the support pieces 65, 65 are urged against those inner sides of the plate portions 75a, 75a constituting the support arm portions 74, 74 which are adjacent to the fixed wall 56, and thrust loads toward each other are applied to the plate portions 75a, 75a. Most of the thrust loads applied to the plate portions 75a, 75a in this manner are applied as loads in a compressing direction to the fixing rods 80 through the fixed arm portions 76a, 76b and are offset in these fixing rods 80. Some of the thrust loads are transmitted to the connecting rods 90 and are offset in these connecting rods 90.

When conversely, in order to effect deceleration between the input side discs 2, 2 and the output side discs 4, 4, the peripheral surfaces 8a, 8a of the power rollers 8, 8 are made to bear against those portions of the inner sides 2a, 2a of the input side discs 2, 2 which are near the inner diameter thereof and those portions of the inner sides 4a, 4a of the output side discs 4, 4 which are near the outer diameter thereof, thrust loads away from each other are applied to the pair of support posts 71, 71. In this state, the other end surfaces of the cylindrical portions 69, 69 of the support pieces 65, 65 are urged against those inner sides of the plate portions 75b, 75b constituting the support arm portions 74, 74 which are remote from the fixed wall 56, and thrust loads away from each other are applied to the support plate portions 75b, 75b. Most of the thrust loads applied to the support plate portions 75b, 75b in this manner are applied as loads in a pulling direction to the connecting rods 90 through the connecting plate portions 77, 77 and are offset in these connecting rods 90. Also, some of the thrust loads are transmitted to the fixing rods 80 and are offset in these fixing rods 80.

The toroidal type continuously variable transmission of the present invention is constructed and acts as described above, and can realize a practical structure in which provision is made of two sets each having three power rollers, six in total, and moreover, the loads applied to the power rollers can be supported. Therefore, the toroidal type continuously variable transmission can be utilized as a transmission for vehicles of great cubic capacity.

What is claimed is:

1. A half-toroidal-type continuously variable transmission comprising:

a housing;

a fixed member provided inside said housing;

a first rotary shaft rotatably supported by said fixed member;

a second rotary shaft inserted in said first rotary shaft and rotatable relative to said first rotary shaft;

a pair of first discs each having an inner side surface including a concave surface with a substantially arcuate cross-section and an outer side surface provided on a back side of said inner side surface, said first discs being nonrotatably fitted to said first rotary shaft with said outer side surfaces being disposed on opposite sides of said fixed member;

a pair of second discs each having an inner side surface including a concave surface with a substantially arcuate cross-section and an outer side surface provided on a back side of said inner side surface, said second discs being nonrotatably fitted to said second rotary shaft with said inner side surfaces opposed to said inner side surfaces of said first discs to form first and second sets of said first and second discs;

power rollers each having a peripheral surface substantially in the shape of a portion of a sphere, which contacts the inner side surfaces of said first and second discs, three of said power rollers being provided between said first and second discs of said first set and three of said power rollers being provided between said first and second discs of said second set;

displaceable shafts each rotatably supporting a respective one of said power rollers;

trunnions each supporting a respective one of said displaceable shafts;

pivots each having an axis orthogonal to said first and second rotary shafts and tiltably supporting a respective one of said trunnions;

support pieces pivotally supporting ends of said pivots;

pivotally movable support shafts each pivotally supporting a respective one of said support pieces; and two support posts each supporting three of said pivotally movable support shafts, said support posts each being provided between said first and second discs of a respective one of said first and second sets and having a base portion through which said second rotary shaft extends and three support arm portions each provided with a pair of first and second plate portions which extend substantially in parallel to each other from said base portion, each of said pivotally movable support shafts being inserted through a respective pair of said first and second plate portions of said support arm portions and being connected to a respective one of said support pieces at a portion of said one support piece disposed between said first and second plate portions, and each of said first plate portions of each of said support posts being fixed to said fixed member through a fixing rod.

2. A half-toroidal-type continuously variable transmission according to claim 1, wherein one of said second plate portions of one of said support posts is connected by a connecting rod, extending through said fixed member, to one of said second plate portions of another of said support posts.

3. A half-toroidal-type continuously variable transmission according to claim 2, wherein said fixing rods are not movable in an axial direction and each of said first plate portions is fixed to a respective one of said fixing rods by a nut, and wherein each of said fixing rods has a shoulder portion contacting said fixed member so that a force applied to said support posts in the axial direction is received by said nut or said shoulder portion.

4. A half-toroidal-type continuously variable transmission according to claim 1, wherein said fixing rods are not movable in an axial direction and each of said first plate portions is fixed to a respective one of said fixing rods by a nut, and wherein each of said fixing rods has a shoulder portion contacting said fixed member so that a force applied to said support posts in the axial direction is received by said nut or said shoulder portion.

* * * * *